United States Patent [19]

Doty

[11] 4,428,600
[45] Jan. 31, 1984

[54] TENSION RELEASE DEVICE WITH REDUCED DOOR CLOSING RESISTANCE

[75] Inventor: Gerald A. Doty, Crown Point, Ind.

[73] Assignee: Gateway Industries, Inc., Chicago, Ill.

[21] Appl. No.: 395,356

[22] Filed: Jul. 6, 1982

[51] Int. Cl.³ .............................................. A62B 35/02
[52] U.S. Cl. .................................. 280/802; 242/107.6; 280/807
[58] Field of Search ............... 280/802, 803, 806, 807, 280/808; 242/107.6, 107.7

[56] References Cited

U.S. PATENT DOCUMENTS

| | | | |
|---|---|---|---|
| 3,957,223 | 5/1976 | Colasanti et al. | 242/107.6 |
| 4,065,072 | 12/1977 | Magyar | 280/807 |
| 4,198,011 | 4/1980 | Kamijo et al. | 280/807 |
| 4,206,888 | 6/1980 | Magyar | 242/107.7 |
| 4,295,684 | 10/1981 | Naitoh | 242/107.6 |

Primary Examiner—David M. Mitchell
Assistant Examiner—Ross Weaver
Attorney, Agent, or Firm—Fitch, Even, Tabin & Flannery

[57] ABSTRACT

In a seat belt retractor having a rewind spring and a tension relieving mechanism for removing spring tension from the belt worn by the user, a device for releasing the tension relieving mechanism to allow for belt retraction exerting a resistance to door closing which decreases from initial door-release device contact through full door closure. The release device includes a door-actuated lever, which pivots between a release position engaging the tension relieving mechanism and a non-release position, and a spring that biases the lever to its release position when the door is opened. The spring, having tension directed through its longitudinal axis is connected at one end to the lever outward of its pivotal axis and pivotably connected at the other end to the retractor frame at a location eccentric to the pivotal axis of the lever. As the lever is pivoted by the closing door from its release to its non-release position, the spring shifts about the frame location as increased tension is applied along the longitudinal axis of the spring but with the longitudinal axis of the spring shifting towards a perpendicular to the direction of door closing so that the moment of force of the spring in opposition to door closing decreases.

13 Claims, 4 Drawing Figures

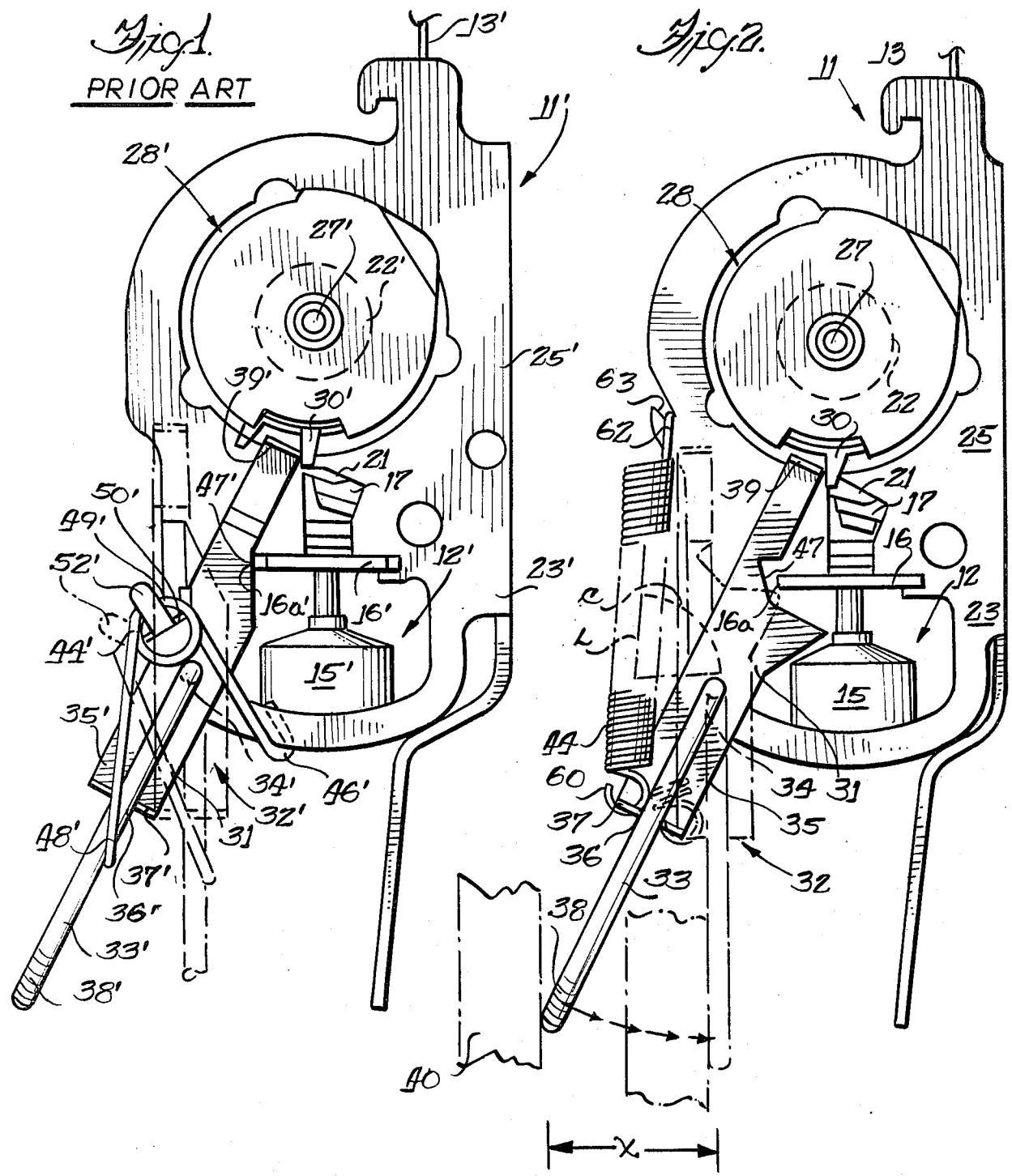

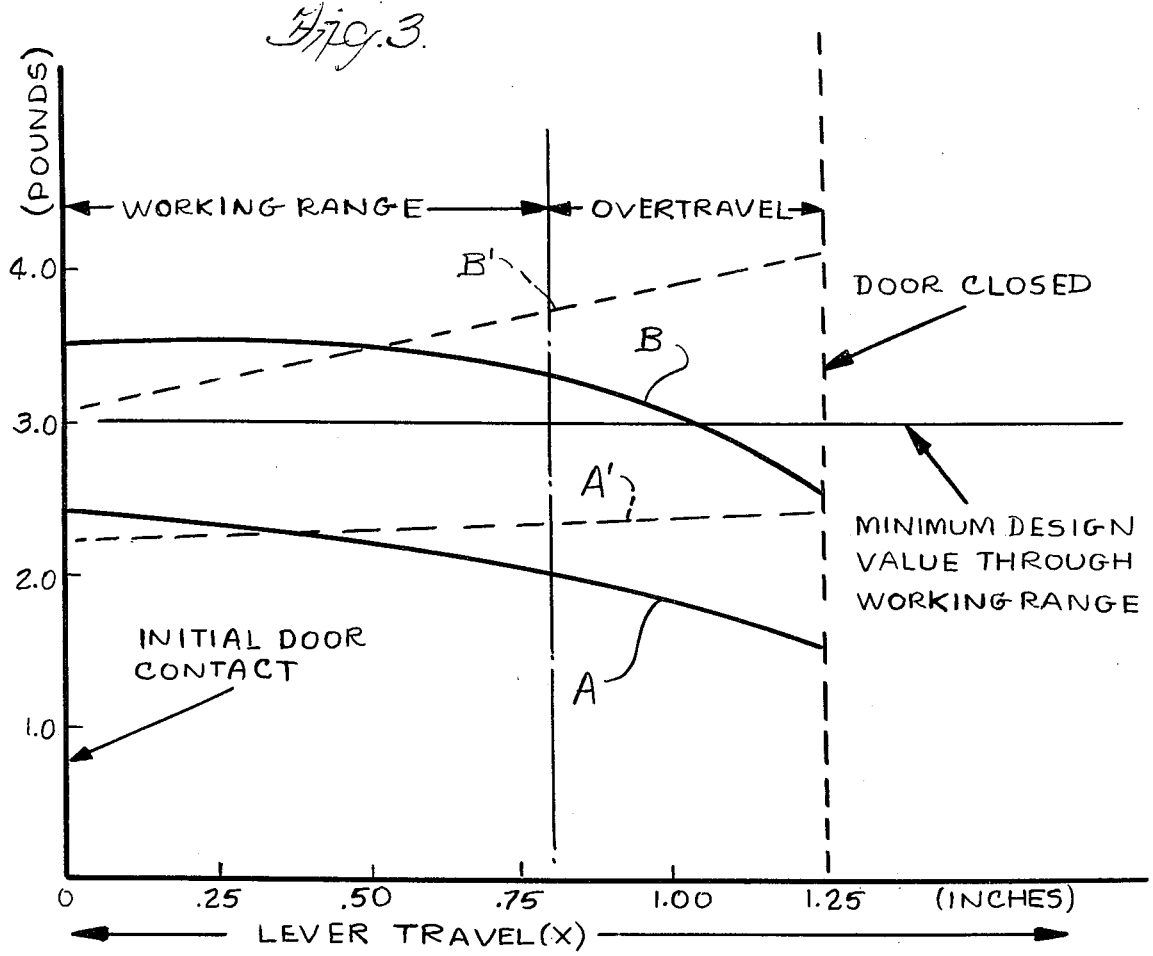
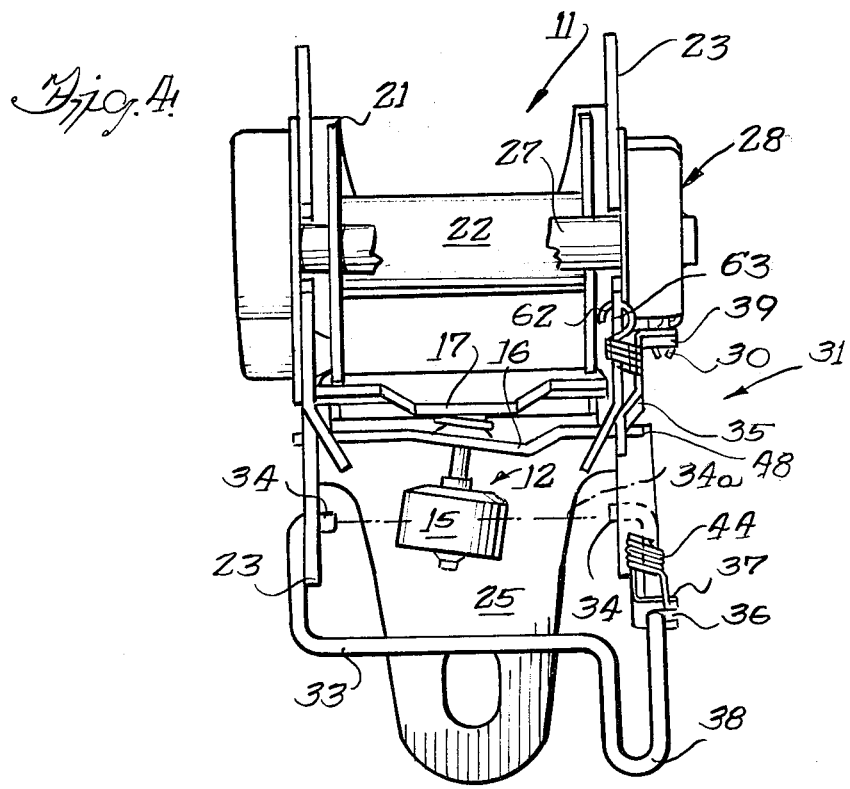

TENSION RELEASE DEVICE WITH REDUCED DOOR CLOSING RESISTANCE

This invention relates to a safety belt system and more particularly to a release device for a seat belt system having a mechanism for relieving tension of the seat belt on the passenger.

The invention is applicable to a seat belt system having a shoulder belt connected to a belt retractor in which a winding spring exerts tension on a belt to rewind the belt when the belt is removed from the wearer. Present seat belt systems, particularly the so-called loop systems, have a large winding spring to ensure that the lap belt is pulled tighly across the wearer to a sliding D-ring or tongue plate of a 3-point restraining belt system. The rewind tension of spring on the belt would tend to bind the occupant of the vehicle; however, in present day seat belt systems, tension relieving mechanisms are commonly employed to eliminate or reduce the retraction force of the rewind spring on the belt thereby contributing to the comfort of the occupant. A number of such tension relieving mechanisms have been described previously for example, U.S. Pat. No. Re. 29,095; U.S. Pat. Nos. 4,023,746; 4,065,072.

While the tension relieving mechanisms is engaged, the belt will not rewind, and accordingly, release devices are provided to insure rewind of the belt when it is not worn by an occupant. Commonly, such release devices are actuated by the door of the vehicle because it is assumed that the occupant, after unbuckling his belt, will leave the vehicle. When the release is activated, the belt fully retracts.

Door actuated device for releasing tension relieving mechanisms generally employ a lever or button including a spring which biases the lever or button to a release position in which the lever or button extends into the open doorway. An undesirable consequence of such a release device is the added force required to close the door in order to overcome the biasing force of the spring. Not only does the spring add to the force needed to close the door, but the spring arrangements, in devices heretofore described and used, generally result in increasing door-closing resistance throughout door closures as a result of the spring becoming more and more strained. At the very end of door closing, the spring is under its greater tension and the release device exerts the greatest amount of resistance to door closing. This situation is problematic, especially if upon not fully closing the door on the first attempt, the passenger attempts to push completely shut a partially closed door. It would be desirable to have a release device for a tension relieving mechanism in which the resistance to door closing is initially low and decreases as the door is closed.

Accordingly, it is a general object of the present invention to provide door actuated release devices having lower resistance to closing and more particularly to such devices in which the resistance to closing decreases toward full door closure. These and other objects and advantages of the present invention will become more apparent in the following detailed description in reference to the accompanying drawings in which:

FIG. 1 is a side elevation view of a prior art seat belt retractor;

FIG. 2 is a side elevation view of a seat belt retractor having a tension relieving mechanism and a release device, associated therewith, embodying various features of the present invention;

FIG. 3 is a graph comparing the resistance to door closing and the force exerted on the tension relieving mechanism of the retractors of FIGS. 1 and 2; and FIG. 4 is an end elevation view of the seat belt retractor of FIG. 2.

As shown in FIG. 4 the drawings for purposes of illustration, the invention is embodied in a conventional safety belt retractor 11 which may be of various shapes and configurations but typically includes an emergency energy locking mechanism 12 for operating to prevent further belt extraction at the time of an accident. While the emergency energy operating locking mechanism 12 may be of the belt or the reel sensistive kind operated by fast protractions of the belt, the preferred emergency energy locking mechanism is of the vehicle inertia operated kind which comprises a pendulum weight 15 mounted on a support bar 16 for swinging movement operating a pivotally mounted locking bar 17 to pivot into locking engagement with a pair of ratchet wheels 21 mounted to opposite sides of a webbing or seat belt reel 22 carried by a reel shaft 27 extending between opposite sides of a retractor frame 25. The reel shaft 22 is journalled to rotate in the frame sides, and a spirally wound clock-like spring (not shown) is attached to one end of the reel shaft 27 to rewind the seat belt 13. Herein a tension relieving mechanism, indicated generally at 28, is mounted to frame side 23 opposite the rewind spring and is centered on the reel shaft 27 and secured by the frame side.

The tension relieving mechanism 28 may be of various types heretofore described. An example of such a tension relieving mechanism is found in U.S. Pat. No. Re. 29,095 in which a pair of turnable discs are shifted to allow a pawl to drop into engagement with a tensionless ratchet wheel secured to the belt reel shaft or shifted to lift and/or block movement of the pawl from engaging the tensionless ratchet wheel whereby the rewind spring is free to rewind the belt. The protrusion 30 may be of an extension from one of the discs to cause the latter to actuate the tensionless pawl to its release position allowing belt rewind.

FIG. 1 shows a prior art seat belt retractor 11' having a door-actuated release device 32' currently used and FIG. 2 shows a retractor 11 having a release device 32 embodying various features of the present invention. For ease of explanation, the reference numerals are primed in FIG. 1 and unprimed in FIG. 2, and corresponding parts in the two figures are labeled with the same numerals, either primed or unprimed.

Remote operation of the tension relieving mechanism is by a remote actuating means 32 including a lever means 31 is hinged to the frame 25 of the retractor 11 for pivoting between a non-release position (in ghost) out of contact with the protrusion 30 and a release position (in solid) in contact with and acting upon the protrusion. The illustrated lever means 31 includes a lower door-contacting wire form or bail 33 mounted for rotation from the retractor frame 25 and an lever 35 which moves with the wire form to operate on the protrusion 30. Inturned upper ends 34 (FIG. 4) of the wire form are inserted in coaxial apertures (not shown) in the opposite frame sides 25 for rotation therein, whereby the lever means 31 pivots along a pivot axis 34a (FIG. 4) defined by the end segments. In order that the wire form 33 and lever 35 pivot together, the bail is interconnected to the wire form at two locations; at the pivotal axis 34a by one of the inturned ends 34 extending through an aperture in the lever 35, and at the lower end of the lever the wire form extends through a slot 36 in a flange 37 on lower end of the lever.

A lower portion 38 of the wire form 33 extends outward of the frame 25 a substantial distance, and the retractor 11 is mounted in relationship to the doorway so that the extending portion, in the release position, extends toward the doorway, a position it can only assume when the door 40 of the vehicle is open. The extending portion 38 is acted upon by the door by a device (not shown), such as a push button, that moves in unison with the extending portion and extends into the doorway in the release position to be actually contacted by the closing door. For purposes of further discussion, the device that actually extends into the doorway will be considered to be part of the lever 35. Whenever the door 40 is closed, the door acts on the extending portion 38 holding the wire form 33 inward of the doorway and retaining the lever means 31 in its non-release position with the upper end 39 of the lever 35 out of contact with the relieving mechanism protrusion 30.

To assure rewind or retraction of the belt 13 whenever the occupant leaves the vehicle, means 44 are provided to bias the lower means 31 to its release position whenever the door 40 of the vehicle is opened. The biasing means 44 causes the lever means 31 to swing clockwise (in reference to the drawings) so that the lower end 38 of the wire form 33 extends into the doorway while the upper end 39 of the lever 35 contacts and pushes to the right the protrusion 30 to cause a release of the tension relieving mechanism. The extent of lever swing in the clockwise, release direction is limited by a stationary stop 16a herein formed by an outwardly protruding portion of the support bar 16 of the emergency energy locking mechanism 12. A portion 47 of the lever 35 swings to abut the stop 16a when the door is opened.

The retractor 11' in FIG. 1 has a spring 44' that is exemplary of biasing means which have heretofore been used to hold a door-contact member 33' in an open vehicle doorway. The biasing means 44' is a coiled spring having radially extending end sections 46', 48' by which a torsion spring force is applied to the coils 49', the coils constricting according to the relative positions of the end sections 46' and 48'. The coils 49' of the spring 44' are held along the side 23' of the retractor frame 25' by a bracket 50' having an outer retaining tab 52', and one end 46' of the spring 44' is hooked to frame side while the other end 48' of the spring hooks around the rod 33'. The wind of the coils 49' is such that when the door is closed and acting upon the lever 31', the spring end 48' hooked around the lever is pushed toward the frame-held end 46' causing constriction of the coils 49', which constriction creates a tension urging the lever 31' towards its release position. It is the nature of springs 44' of this type that the more the coils 49' are constricted, the greater the spring tension and the greater force the spring exerts in resistance to door closing. Thus, the spring 44' in the retractor 11' of FIG. 1 creates an increasing resistance to door closing from the moment of initial door-lever contact to full door closure.

When the door is nearly fully closed, friction created by door frame members, such as the resilient door molding, increases, and the additional resistance exerted by the seat belt retractor lever means 31 may result in incomplete door closure if insufficient closing force was initially applied. If the door does not completely close and the occupant after leaving his car attempts to push the partially closed door shut, the release device resistance added to the absence of a full swing of the door may be the difference between the door closing upon the subsequent push, or necessitating complete reopening of the vehicle door at further inconvenience of the occupant.

The problem of increasing door closing resistance is not peculiar to a spring of the constricting coil type but is inherent in any retractor design where the release device biasing means provides a moment of force directed substantially in opposition to the direction of door closing. This is true in cases in which the release means includes a compression or tensile spring that biases a door-contacting button outward into the doorway. In spring-biased, door-actuated release devices heretofore employed, the moment of force in the door resistance direction increases from the moment of initial door contact to full door closure.

In accordance with the present invention, a door-actuated release device 32 is provided in which the moment of force exerted by the biasing means 44 in opposition to door closing decreases from initial door contact to full door closure. To this end, biasing means or spring 44, which urges the release lever 31 to its release position, is arranged so that as the door closes, the moment of force in the direction perpendicular to the force of the closing door increases while the moment of force in opposition to door closing decreases. Herein, a coiled contractile spring 44 is operably connected at one end 60 to the lever means 31 at a location radially outward of its pivotal axis and connected at its other end 62 to a fixed location on the vehicle or retractor 11 that is eccentric to the pivotal axis 34a of the lever means 31. As the lower end of the spring 44 swings about its upper end, its longitudinal axis L becomes increasingly perpendicular to the direction of the door 40 in its final stages of closing. Even though the tensile spring 44 becomes increasingly elongated as the lever means 31 is shifted by the door 40 from its release to its non-release position increasing the tension force along its longitudinal axis L, the swinging of the spring's lower end toward the pivot axis 34a results in its moment of force in opposition to door closing to actually decrease from its initial value.

The illustrated coil spring 44 is a tightly coiled spring in which its coils, when free of tension, are in contact with adjacent coils. The spring's lower end 60 is looped and hooked through the slot 36 (FIG. 4) in the lower lever flange 37, and its upper end 62 is locked in a notch 63 formed in the edge of the frame side 23.

When the door 40 closes and actuates the lever means 31, the flange 37 at the lower end of the lever 35 swings away from the notch 63 causing elongation of the spring 44, and this increased tension operates to shift the lever back to its release position when the door is reopened. Preferably, the increased tension does not approach the capacity of the spring 44 to help insure long-term reliable functioning of the release device 32.

Illustrated in FIG. 3 is a graph which represents measured resistance forces A, A' to door closing exerted by the release devices 32, 32' and the lever forces B, B' on the tension relieving mechanisms 28, 28' during door closing for the prior art retractor 11 shown in FIG. 1 and for the embodiment of the present invention shown in FIG. 2. In both cases, the tension relieving mechanism 28, 28' are identical, and the general configuration of the retractors 11, 11' and release levers 31, 31' are the same. The release levers 31, 31' are moved an equal distance (x) (FIG. 2) from initial door-lever contact to full door closure.

As illustrated in FIG. 3, the resistance to door closing created by the torsion spring 44' in the conventional (FIG. 1) design, as shown by curve A', increases from the moment of initial door-level contact as a result of the spring coils and arms being compressed. The spring force of about 2.2 pounds in this example increases to about 2.4 pounds, or an increase of approximately 6 percent.

In contrast the door resistance force exerted by the spring 44 of the FIG. 2 embodiment, as shown by curve A, decreases steadily from the moment of initial door-level contact until full door closure. By way of example, the force decreased from about 2.4 pounds to 1.5 pounds for curve A.

In the illustrated embodiment, the force exerted by the level 31 against the door at its closing is 38 percent less than the force initially exerted by the level against the door. It is preferred that the resistance be decreased by at least 25 percent during door closing. Likewise, curve B' shows the force available at the upper end 39 of the level 35 to cause protrusion 30 to move to the right to cause a release of the tension relieving mechanism. This force increases steadily as the door 40 is closed, e.g., from slightly over 3 pounds to slightly over 4 pounds.

This is directly opposite to the desired force curve. The larger forces are needed in the working range (FIG. 3). It is in this area the actual work or release of the tensionless mechanism takes place. In most cases this work is performed in the range of "Initial Door Contact" and 0.5 inch traul.

In sharp contrast to the substantial increase in total force shown by curve B', curve B shows a sharp decline in the total force e.g., from about 3.5 pounds to 2.5 pounds, with the larger forces being within the working range.

It is to be appreciated the contractile spring 44 expands considerably as the door closes and the door pivots the lever 31, but this expansion and the force therefrom are primarily in the vertical direction as the lower spring end shifts between the solid and dotted line positions of FIG. 2. With the spring being inclined substantially vertically with its lower end connected to a lower portion of the lever, the longitudinal axis of the spring swings closer to the pivot axis 34a upon the door closing so that most of the spring force is directed upwardly on the lever and only a small component of the spring force is directed horizontally to cause the lever to pivot clockwise about the bail ends 34. Thus, more and more of the spring's force is directed into the lever's pivotal mounting and less and less force is directed toward the door as a horizontal force component resisting the door closing. As shown in FIG. 2, the lowest end of the bail 33 travels through a substantial horizontal distance "x" with door closing but only through a short vertical displacement.

As the lever means 31 is shifted by the door 40 from its release to its non-release position, the pivoting of the lever along an axis eccentric to the swinging axis of the spring 44, i.e., that provided by the upper end 62 of the spring and the catch 63, results in spring elongation and increased spring tension. However, the resistance to door closing exerted by the spring is the product of the total spring tension and the cosine of the angle C of the longitudinal spring axis L to the direction perpendicular to door closing force, and because the cosine decreases as the spring axis L becomes more perpendicular, the moment of force in resistance to door closing decreases steadily. The moment of force in the perpendicular direction increases both due to the increase in sine of the angle C and the actual increase in spring tension. This perpendicular moment of forces does not affect door closing but instead is transferred primarily to the pivot mount of the lever 31 from the frame 25.

Several advantages of the invention can now be more fully appreciated. Most importantly, the invention provides a release device for a tension relieving mechanism which opposes door closing with decreasing force until the door is fully closed helping to assure complete door closure with a minimum of force. Full door closure is important to passenger safety while ease of closing is an appreciated occupant convenience. An additional advantage of the embodiment of the present invention shown in FIG. 2 over the prior art embodiment shown in FIG. 1 is the use of a tensile spring rather than the use of a constricting coil spring. Constricting springs as used in prior art devices, such as illustrated in FIG. 1, have been found to cock and bind, a problem which is avoided by the use of a tensile spring. Furthermore, tensile springs of various sizes are readily available, and the retractor of FIG. 2 using such a spring may be built with an inexpensive stock spring, whereas the constricting spring of the prior art embodiment (FIG. 1) generally must be specially manufactured for the particular retractor configuration representing a substantial additional expense.

While the invention has been described in terms of a preferred embodiment in which the biasing means is a tensile spring disposed to align itself increasingly perpendicular to door closing force as the door is closed, other spring arrangements might be used as well. For example, a compressile spring might be connected to the lever and hinged to the retractor frame at a location which results in shortening of the distance between the ends of the spring and compression of the spring as the lever is pivoted by the closing door. Other spring or biasing arrangments might also be used for pivoting a release lever, button etc. in which the moment of force is shifted increasingly away from opposition to door closing in spite of actual increased force of the spring or biasing means itself.

Various features of the invention are set forth in the following claims.

What is claimed is:

1. A safety belt retractor for a vehicle having a door comprising:
   a rotatable reel having a belt wound thereabout for protraction and retraction from the reel;
   spring means biasing the reel to retract and to rewind the belt into the reel;
   tension relieving means movable from an inoperative position to an operative position for relieving the belt tension being exerted on the protracted belt by said return spring;
   actuating means for actuating the tension relieving means to cause the belt to automatically rewind, the actuating means being held by a vehicle door in a non-actuating position until the door is opened, and
   biasing means biasing the actuating means to actuate the tension relieving means from the operative to the inoperative position to cause automatic rewind of the belt onto the reel;

said biasing means exerting a force on the vehicle door which diminishes as the door moves to its closed position.

2. A retractor in accordance with claim 1 in which the actuating means comprises a pivotally mounted lever having one end operable by the door, and the biasing means comprises a contractile spring exerting a component of force on the lever in the direction of door closing that diminishes as the lever is pivoted by the door.

3. A retractor in accordance with claim 2 in which the closing door imparts a substantial horizontal movement to a lower end of the lever, the contractile spring being inclined and extending generally in the vertical direction.

4. A retractor in accordance with claim 3 in which a pivot means mounts the lever intermediate its ends for pivoting about a pivot axis, one end of the contractile spring being connected to a lower portion of the lever and at a position spaced from the axis, the pivoting of lever by the door shifting the spring closer to the pivot axis.

5. A safety belt retractor for a vehicle having a door comprising: a rotatable reel having a belt wound thereabout for protraction and retraction from the reel; spring means biasing the reel to retract and to rewind the belt into the reel; means for relieving the belt tension from that being exerted on the protracted belt by said return spring; means for releasing said tension relieving means upon opening of the door of the vehicle, said releasing means operable by the closing door of said vehicle to disengage said releasing means from said relieving means; and biasing means to engage said releasing means with said relieving means when the door is opened to allow belt retraction, said biasing means exerting a resistance to vehicle door closing which diminishes from the moment of initial contact of the closing door with said releasing means to full closure of the door.

6. A retractor according to claim 5 wherein resistance exerted by said biasing means diminishes by greater than about 25 percent from the moment of initial contact to full door closure.

7. A retractor according to claim 5 having means for locking the belt against further protraction at the time of an accident.

8. A retractor according to claim 5 wherein said releasing means is a lever pivotable between a position of engagement with said relieving means to release the same and permit full belt retraction and between a position of non-engagement with said relieving means.

9. A safety belt retractor for a vehicle having a door comprising a rotatable reel having a belt wound thereabout for protraction and retraction from the reel; spring means biasing the reel to retract and to rewind the belt into the reel; means for relieving the belt tension from that being exerted on the protracted belt by said return spring; lever means pivotable between a position of engagement with said relieving means to release the same and permit full belt retraction and between a position of non-engagement with said relieving means, said lever means being pivoted by the closing door of said vehicle into said non-engagement position; and means for biasing said lever means to said engagement position when the door is opening, said biasing means exerting a force on said lever including a moment of force in resistance to door closing and a moment of force perpendicular thereto, the moment of force in resistance to door closing diminishing from the moment of initial contact of the closing door with said lever means until full door closure.

10. A retractor according to claim 9 wherein said spring is a coil spring exerting a moment of force along its longitudinal axis, said coil spring having a first end attached to said lever means radially outward of its pivotal axis and a second end hinged at a fixed location on said retractor or the vehicle so that the longitudinal axis of said spring is aligned by said lever, pivoted by the closing door, increasingly perpendicular to the moment of force exerted on said lever means by the closing door.

11. A retractor according to claim 10 wherein said spring is a tensile spring.

12. A safety belt retractor for a vehicle having a door comprising a rotatable reel having a belt wound thereabout for protraction and retraction from the reel; spring means biasing the reel to retract and to rewind the belt into the reel; means for relieving the belt tension from that being exerted on the protracted belt by said return spring; lever means pivotable along an axis between a position of engagement with said relieving means to release the same and permit full belt retraction and having an end disposed in the doorway whereby the closing door pivots said lever to a position of non-engagement with said relieving means; and coil spring means having a longitudinal axis along which tension is directed attached at a first end to said lever means radially outward of its pivotal axis and a second end hinged to said retractor or said vehicle at a location eccentric to said lever axis for pivoting said lever means to said engagement position as the door opens, the longitudinal axis of said coiled spring means being aligned by said lever means, pivoting in response to door closing, increasingly perpendicular to the moment of force exerted on said lever means by the closing door.

13. A retractor according to claim 12 wherein said spring is a tensile spring.

* * * * *